Jan. 1, 1946.  A. M. BANDY  2,391,869
SIDEWALL PRODUCTION TESTER
Filed June 13, 1940  2 Sheets-Sheet 1

INVENTOR.
ALVIN M. BANDY
BY Jesse R. Stone
Lester B. Clark
ATTORNEYS

Jan. 1, 1946.  A. M. BANDY  2,391,869
SIDEWALL PRODUCTION TESTER
Filed June 13, 1940  2 Sheets—Sheet 2
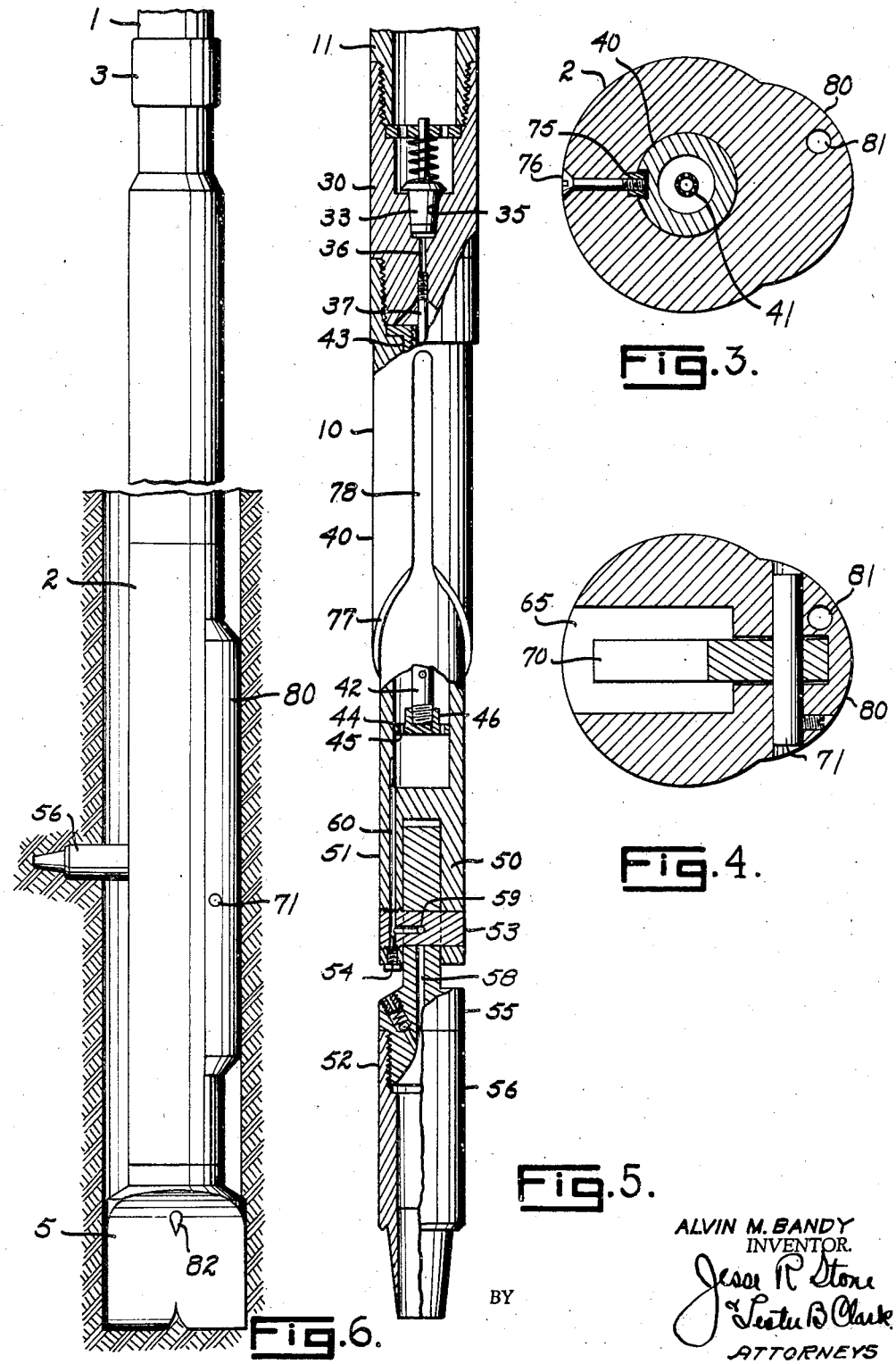
ALVIN M. BANDY
INVENTOR.
BY Jesse R. Stone
Lester B. Clark
ATTORNEYS Patented Jan. 1, 1946

2,391,869

UNITED STATES PATENT OFFICE 2,391,869

SIDE-WALL PRODUCTION TESTER

Alvin M. Bandy, Ganado, Tex.

Application June 13, 1940, Serial No. 340,247

4 Claims. (Cl. 255—1.4)

This invention relates to a device for testing the productivity of formations penetrated by a bore hole and particularly to a device for obtaining samples of both fluids and solids from the penetrated formation.

The primary object of the invention is to provide a device of the class described for obtaining side wall samples within a well bore, such samples including both fluids and solids from the formation tester.

Another object is to provide a side wall sampler which includes a formation sample chamber adapted to move outwardly and enter the side walls of a well bore to entrap a sample of the penetrated formation.

Still another object is to provide a device of the class described which includes a fluid sample chamber adapted to receive a fluid sample after the solids sample chamber has entered the formation being tested.

Still another object is to provide a device in which the fluid sample chamber is open only during the time when a sample is being received therein.

Another object is to provide a device which is lowerable into a drill stem and thereafter retrieveable with entrapped solids and fluid samples.

A further object is to provide a device which may be lowered into and latched in sample taking position within a drill stem, the taking of the desired samples from a penetrated formation being effected by movement of the drill stem when the device is latched in position.

The foregoing objects together with other objects may be attained thru the use of the illustrated embodiment of the invention shown in the accompanying drawings in which:

Fig. 3 is a sectional view taken on line 3—3 in Fig. 2;

Fig. 4 is a sectional view taken on line 4—4 in Fig. 2;

Fig. 5 is an elevational view of the sample taking assembly, parts being shown in section to illustrate the internal construction thereof;

Fig. 6 is a sectional view thru a bore hole showing the relative positions of the drill stem and the sample taking assembly.

Figure 1:
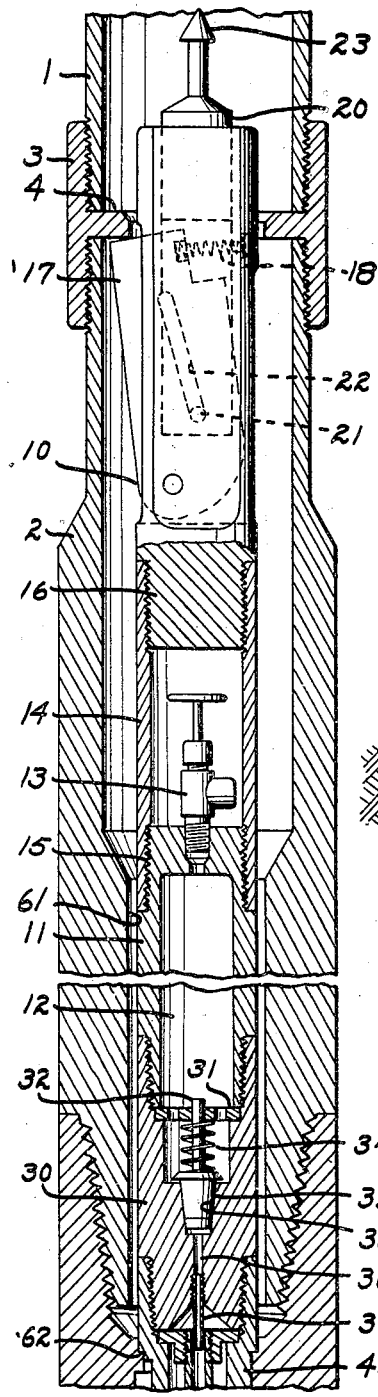
Figs. 1 and 2 are sectional views of successive portions of an illustrative embodiment of the invention, the portion shown in Fig. 2 indicating the relative position of parts when the desired samples are being taken.

In the drawings the numeral 1 refers to a tubular drill stem which includes a special collar 2. A section of the drill stem 1 and the collar 2 are interconnected by means of a coupling 3 having an inwardly projecting flange 4. The collar 2 is shown as a drill collar to which is attached a bit 5 (Fig. 6) altho it is to be understood that such collar may be connected in the drill stem at a point other than one approximate the drill 5.

Figure 2:
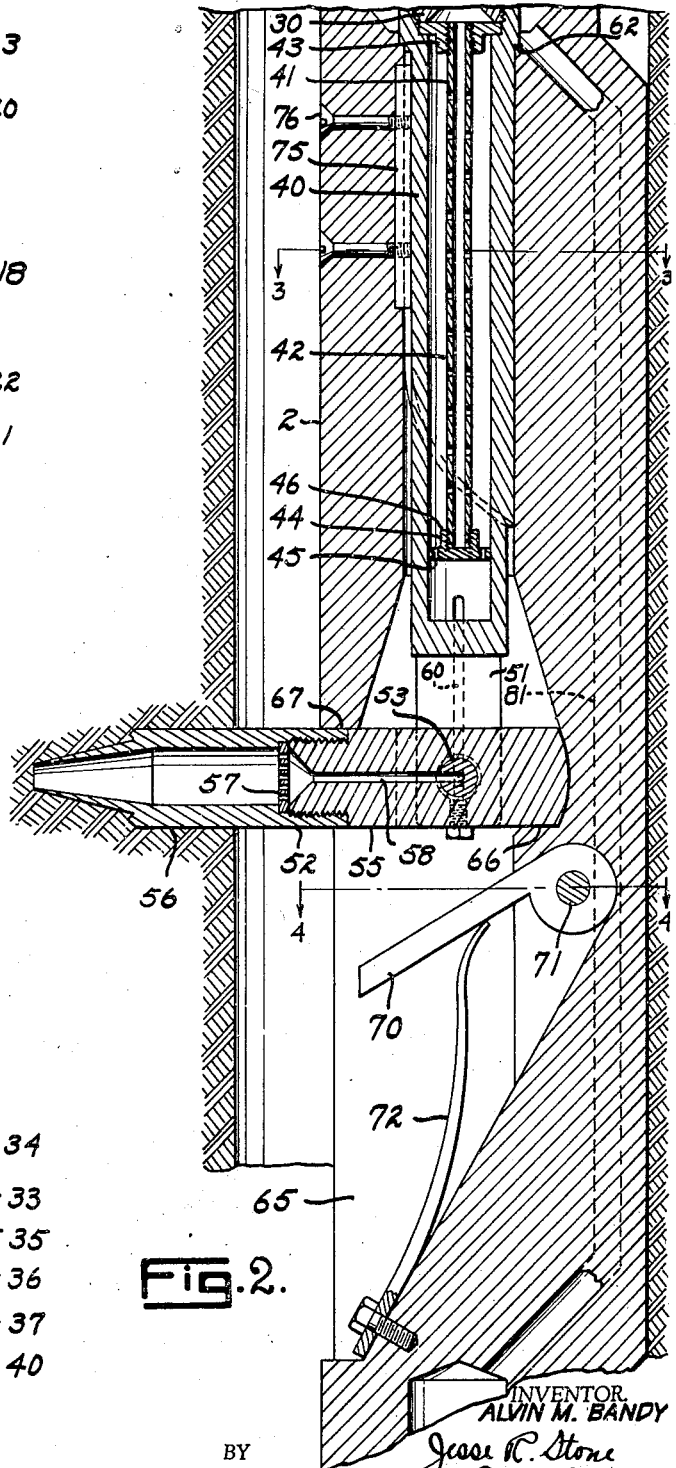

The construction of the collar 2 is such as to receive a sample taking assembly generally referred to as 10 which is shown in Figs. 1 and 2 in sample taking position within the collar 2.

Referring particularly to Figs. 1 and 5 the upper portion of the sample taking assembly 10 of the present invention may be and is illustrated the same as that shown in my Patent 2,176,249, issued October 17, 1939. Such structure comprises a tubular container 11 having a fluid sample receiving chamber 12 therein. The upper end of the chamber 12 is closed by means of a valve 13 which is surrounded by a housing 14 threadably connected to the container 11 at 15.

The other end of the housing 14 is threadably attached to a head 16 channeled to receive a latch 17 which is urged outwardly by means of a compression spring 18 to engage the nether face of the flange 4 on the coupling 3.

A plunger 20 movable within the head 16 straddles the latch member 17 and carries a pin 21 which slides within a slot 22 in the latch 17 so that lifting of the plunger 20 as by means of an overshot engaging the head 23 on the plunger 20 disengages the latch and allows the device to be lifted from sample taking position.

The lower end of the container 11 comprises a collar 30 which engages a valve guide plate 31 thru which the stem 32 of valve 33 passes. A spring 34 engages the guide plate 31 and the valve 33 to normally hold the valve upon its seat 35 so that the passage to the interior of the container 11 is normally closed. The passage 36 leading to the valve 33 is provided with a small tubular extension 37 which serves as a choke to control the entrance of fluid to the chamber 12 thru the valve 33. This control of the fluid flow is such as to prevent such rapid influx of fluid that solids from the formation are caused to enter the chamber 12.

A tubular barrel 40 is attached to the collar 30 in a manner to secure a strainer assembly 41 in place therein. Such strainer assembly comprises a perforated tubular member 42 having an upper plate 43 with an axial opening into which the member 42 is attached. This plate 43 is engaged between the collar 30 and the barrel 40 to fix the assembly in position. The lower end of the tubular member 42 is attached to a disc 44 which fits slidably within the bore of the barrel 40 and has a plurality of openings 45 arranged annularly about the boss 46 into which the member 42 is attached. This construction is such that fluid entering the lower end of the barrel 40 will move upwardly about the perforated member 42 and pass thru the openings therein to the lower end of the chamber 12.

A pair of legs 50 and 51 extend downwardly from the barrel 40 and the solids receiving chamber generally referred to as 52, is pivotally attached thereto by means of a pin 53 which is secured in place by a set screw 54. The solids receiving chamber 52 comprises a shank 55 having a core tube 56 attached thereto at its outer end. This chamber is adapted to enter the formation to be tested and to cut from such formation a solid sample which is entrapped within the core tube 56. A strainer 57 (Fig. 2) is clamped at the inner end of the core tube to strain the fluid sample which passes therethru and into the passage 58 in the shank 55.

When the sample receiving chamber 52 is moved outwardly into the position shown in Fig. 2 the passage 58 moves into mating relation with the radial portion 59 of a passage in the pin 53. The other end of the passage in the pin 53 is in alinement with a passage 60 in the leg 51 and in this manner a fluid sample is admitted under formation pressure thru the core tube to the lower end of the barrel 40.

The passage thru the drill stem 1 continues into the collar 2 where it is reduced at 61 and this reduced bore has a shoulder 62 against which a complementary shoulder on the barrel 40 engages to determine the lower limit of movement of the sample taking assembly 10 within the collar 2. As the assembly moves to this lowermost position the latch 17 moves outwardly and engages the flange 4 whereby the sample taking assembly is fixed in position within the collar 2.

Below the shoulder 62 the collar 2 has a side slot 65 within which are respective upwardly and downwardly facing buttons 66 and 67 at opposite sides of the pivot pin 53 for the sample receiving chamber 52. Below the abutment 66 is a guiding arm 70 pivoted upon a pin 71 and urged toward a position substantially diametric of the collar 2 by means of a leaf spring 72 secured within the slot 65. This guiding arm and spring assembly serves the function of resiliently urging the core tube 56 outwardly and within the slot 65 as the sample taking assembly moves downwardly to latching position within the collar 2. This construction also permits removal of the drill collar from the well even though the sampler should become stuck therein, because as the collar is raised the sampler will move back into the opening and depress the arm and spring sufficiently to permit clearance of the sampler with the wall of the well bore and prevent wedging of the sampler between the drill collar and the well wall.

In the bore of the collar 2 above the slot 65 there is provided a guide gear 75 secured in place by means of screws 76. This guide key is engageable by the converging shoulders 77 on the barrel 40 whereby the sample taking assembly is rotated until the guide key 75 enters the slot 78 in the barrel 40. The core taking assembly is thus guided angularly to such position that the core chamber 52 is urged outwardly upon its pivot 53 by means of the arm 70 and the associated springs 72.

As already indicated the collar 2 may constitute a drill collar as illustrated in Fig. 6 or may be positioned in the drill stem 1. The collar 2 as illustrated is non-symmetrical in cross section by virtue of an enlargement 80 on the side opposite the slot 65. This enlargement abuts the wall of the bore hole opposite the point at which the core tube 56 enters the formation from which a sample is taken. Hence the drill stem and collar remain substantially coaxial of the bore hole in spite of the side thrust that is produced as the core tube 56 enters the formation.

The enlargement 80 on the collar 2 serves an additional function thru the provision of a bypass passage 81 therein to conduct fluid past the sample taking assembly to the ports 82 in the bit 5. By means of this construction a continuous flow of drilling fluid may be maintained during sample taking operation. Furthermore the bore 61 leading to the slot 65 may be closed by a suitable removable plug (not shown) when the sample taking assembly 10 is removed from within the drill stem whereby normal drilling operations may be pursued.

The operation of the illustrative embodiment of the invention is believed apparent from the foregoing description but by way of summary it may be stated that a sample may be taken at any time during drilling operations and at any desired level within the bore hole. When a sample is to be taken the plug within the bore 61 is removed and the sample taking assembly 10 is lowered as by dropping it upon a cable within the drill stem 1 to the position indicated in Figs. 1 and 2. This causes the core chamber 52 to be canted outwardly into engagement with the side of the bore hole.

The drill stem and the assembly latched therein are then lowered, whereupon the core tube 56 enters the side wall of the bore hole and a sample is fixed therein. As the sample chamber 52 approaches the position indicated in Fig. 2 the passage between such chamber and the barrel 40 is opened and a fluid sample passes thru the passages 58, 59 and 60 to the interior of the barrel 40, thence thru the choke 37 and valve 33 to the interior of the container 11.

As the drill stem is then lifted the core tube 56 is withdrawn from the formation and the passage to the interior of the barrel 40 is closed by pivotal movement of the chamber 52 upon the pin 53. Such withdrawal of the core tube 56 takes place upon relatively small movement of the drill stem 1 and the core taking assembly 10 is then withdrawn from within the drill string in a manner well known in the art.

Broadly the invention comprehends novel apparatus for obtaining a side wall sample from within a bore hole, such sample including both a solid sample and a fluid sample from the formation being tested.

What is claimed is:

1. A device for testing the productivity of formations penetrated by a bore hole comprising a drill stem including a collar having a side slot therein, a sampling assembly adapted to be lowered into and withdrawn from within the drill stem, a normally closed formation sample chamber pivotally connected in said sampling assembly, means within the collar directing said formation sample chamber outwardly through the slot as the assembly enters the collar whereby the formation sample chamber may move outwardly and enter the adjacent formation, means for releasably latching the assembly within the collar, and means for opening the formation sample chamber as it pivots relative to the assembly and moves to sample taking position.

2. A device for testing the productivity of formations penetrated by a bore hole comprising a drill stem including a collar having a side slot therein, a sample taking assembly adapted to be lowered into and removed from within the drill stem, said assembly comprising a member extending longitudinally of the collar and a formation sample chamber pivotally attached to said member and movable outwardly through the side slot to enter the formation as the drill stem and sample taking means are moved axially of the bore hole, there being abutments in the collar on opposite sides of the pivot connection to determine the limit of arcuate movement of the formation sample chamber, and means operable by the outward movement of the formation sample chamber for admitting a fluid sample therethrough to the interior of said member when the sample chamber has moved to a position proximate said abutments.

3. A device for testing the productivity of formations penetrated by a bore hole comprising a drill stem including a collar having a side slot therein, a sample taking assembly adapted to be lowered into and removed from within the drill stem, said assembly comprising a container having a fluid sample chamber and a formation sample chamber pivotally attached to said container to move outwardly through said slot and enter the formation to procure a sample therefrom and admit a fluid sample from the formation to fluid sample chamber.

4. A device for testing the productivity of formations penetrated by a bore hole comprising, a sampling assembly including a fluid sample receiving chamber having legs extending downwardly therefrom, a formation sample chamber, a pivot connection between said chambers, the pivot of the connection and one of said legs having a passage from the bearing surface of the connection to the interior of the fluid sample receiving chamber, and there being a fluid passage from the interior of the formation sample chamber to the bearing surface in the connection movable into mating relation with said first mentioned passage to admit fluid to the fluid sample receiving chamber when the formation sample chamber is moved to sample taking position.

ALVIN M. BANDY.